(12) United States Patent
Baumoel

(10) Patent No.: US 7,185,547 B2
(45) Date of Patent: Mar. 6, 2007

(54) EXTREME TEMPERATURE CLAMP-ON ULTRASONIC FLOWMETER TRANSDUCER

(75) Inventor: Joseph Baumoel, Commack, NY (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 0 days.

(21) Appl. No.: 11/177,229

(22) Filed: Jul. 8, 2005

(65) Prior Publication Data

US 2006/0027029 A1 Feb. 9, 2006

Related U.S. Application Data

(60) Provisional application No. 60/586,958, filed on Jul. 9, 2004.

(51) Int. Cl.
*G01F 1/66* (2006.01)

(52) U.S. Cl. .................... 73/861.27; 73/861.25

(58) Field of Classification Search ............ 73/861.25, 73/861.27
See application file for complete search history.

(56) References Cited

U.S. PATENT DOCUMENTS

| 6,532,827 B1 * | 3/2003 | Ohnishi ............... 73/861.27 |
| 6,715,366 B2 * | 4/2004 | Ohnishi ............... 73/861.27 |
| 6,918,303 B2 * | 7/2005 | Casimiro et al. ......... 73/706 |

* cited by examiner

*Primary Examiner*—Harshad Patel

(57) ABSTRACT

A device for measuring flow in a pipe includes a first metal plate mounted to the pipe, the first metal plate including a first contact portion contacting a wall of the pipe and a first away portion spaced apart from the wall of the pipe, a second metal plate mounted to the pipe, the second metal plate including a second contact portion contacting the wall of the pipe and a second away portion spaced apart from the wall of the pipe, a first transducer mounted to the first away portion, and a second transducer mounted to the second away portion.

27 Claims, 5 Drawing Sheets

EXTREME TEMPERATURE CLAMP-ON ULTRASONIC FLOWMETER TRANSDUCER

CROSS-REFERENCE TO RELATED APPLICATION

This application claims priority to U.S. Provisional Patent Application Ser. No. 60/586,958, filed on Jul. 9, 2004 the contents of which are incorporated by reference in their entirety.

BACKGROUND OF THE INVENTION

1. Technical Field

The present disclosure relates to an ultrasonic flowmeter transducer, and more particularly, to an ultrasonic flowmeter transducer capable of being attached to a pipe and operating under extreme temperature conditions.

2. Discussion of Related Art

The use of a pipe wall as an ultrasonic flowmeter transducer, by exciting the natural waveguide mode of operation in the pipe wall, has been the basis of non-intrusive liquid and gas flowmeters and is referred to herein as the Wide-Beam technique. The use of a pipe wall as an ultrasonic flowmeter transducer, that is the WideBeam technique, is described, for example, in U.S. Pat. No. 6,062,091 to Baumoel, entitled "Method And Apparatus For Determining Ultrasonic Pulse Arrival In Fluid Using Phase Correlation," which is commonly owned and incorporated herein by reference.

In general, ultrasonic energy can be used to determine flow velocity through a pipe by determining the effect of fluid flow on an ultrasonic signal passing through the fluid in the pipe. Ultrasonic flow metering can be performed without requiring intrusion into the pipe by clamping transmitting and receiving transducers onto the pipe and injecting ultrasonic signals through the pipe wall.

To excite this mode of operation, an external ultrasonic transducer can be clamped onto the pipe. The external transducer develops the necessary frequency and phase velocity to match the waveguide properties of the pipe, which depend on the material and the wall thickness of the pipe. Known methods of mounting and clamping external transducers to pipes are described, for example, in U.S. Pat. No. 6,405,603 to Baumoel, entitled "Method For Determining Relative Amounts Of Constituents In A Multiphase Flow," and U.S. Pat. No. 6,418,796 to Baumoel, entitled "Sonic Flow Measurement Apparatus For Tubes Including Sonically Matched Plates," which are commonly owned and incorporated herein by reference.

For example, a clamp-on wide beam ultrasonic flow meter can include a pair of ultrasonic transducers, which are clamped to the exterior of a pipe so as to inject sonic energy into the pipe. In accordance with the wide sonic beam principle, sonic energy from a first transducer is injected into the pipe wall. The sonic energy in the form of a wide beam is injected in the pipe in a way which excites a natural mode of sonic transmission of the pipe. In this way, sonic waves travel down the pipe and are measured by a second transducer. The sonic wave travels down the pipe wall at a velocity characteristic of the pipe's material, and at a frequency dependent on the pipe material and a wall thickness.

As the wave travels down the pipe wall, it radiates a sonic wave into the fluid flow, which ultimately reenters the pipe wall on the same side of the pipe from which it was originally transmitted and then enters the second transducer, wherein sonic energy is output as a receive signal. The receive signal is influenced by the flow through which the wave has passed.

A clamp-on transducer should be made from a material with a sonic propagation velocity considerably lower than that of the pipe material so as to develop the necessary phase velocity. Materials known to have such a velocity are, for example, plastics. Such materials, however, do not have the capability of surviving or functioning for requisite periods of time at temperatures encountered in such applications as steam or very high temperature water, as used in power applications.

Accordingly, means must be developed by which the high performance capability of the WideBeam technique can be extended to very high temperature applications, or to very low temperatures, such as those encountered in cryogenic applications.

SUMMARY OF THE INVENTION

A device for measuring flow in a pipe, in accordance with an embodiment of the present invention, comprises a first metal plate mounted to the pipe, the first metal plate including a first contact portion contacting a wall of the pipe and a first away portion spaced apart from the wall of the pipe, a second metal plate mounted to the pipe, the second metal plate including a second contact portion contacting the wall of the pipe and a second away portion spaced apart from the wall of the pipe, a first transducer mounted to the first away portion, and a second transducer mounted to the second away portion.

The first and second metal plates may be positioned adjacent each other to form a U-shape on the pipe, wherein a bottom portion of the U-shape includes the first and second contact portions and side portions of the U-shape include respective first and second away portions. The first and second metal plates include the same material as the pipe wall and have substantially the same thickness as the pipe wall.

A coupling, for example, a metallic coupling compound or a liquid couplant, can be positioned between the first and second contact portions and the wall of the pipe. A plurality of fasteners, for example U-bolts and/or clamps, may be positioned around the first and second contact portions and the pipe to attach the first and second metal plates to the pipe.

The first and second away portions may include a plurality of thermal radiators extending therefrom and insulation may enclose at least a portion of the pipe and the first and second contact portions.

Sonic energy from the first transducer is transferred to the pipe wall via the first metal plate and the second transducer receives sonic energy from the pipe wall via the second metal plate.

A device for measuring flow in a pipe, in accordance with another embodiment of the present invention, comprises a metal plate mounted to the pipe, the metal plate including a contact portion contacting a wall of the pipe and first and second end portions spaced apart from the wall of the pipe, a first transducer mounted to the first end portion, and a second transducer mounted to the second end portion.

The metal plate may form a U-shape on the pipe, wherein a bottom portion of the U-shape includes the contact portion, and side portions of the U-shape include respective first and second end portions.

A device for measuring flow in a pipe, in accordance with another embodiment of the present invention, comprises a transmit portion mounted to the pipe, the transmit portion including a first away portion spaced apart from the wall of the pipe, a receiving portion mounted to the pipe, the receiving portion including a second away portion spaced apart from the wall of the pipe, a first transducer mounted to the first away portion, and a second transducer mounted to the second away portion.

The transmit portion may comprise a first metal plate including the first away portion and a first contact portion contacting the pipe, and the receiving portion may comprise a second metal plate including the second away portion and a second contact portion contacting the pipe. Alternatively, the transmit and receive portions may be located on a metal plate including the first and second away portions at respective end portions thereof and a contact portion contacting the pipe.

BRIEF DESCRIPTION OF THE DRAWINGS

Preferred embodiments of the invention can be understood in more detail from the following descriptions taken in conjunction with the accompanying drawings in which.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein.

The sonic impedance of a metallic plate made of the same material and having the same wall thickness as a high or low temperature pipe is the same as that of the pipe wall itself. Accordingly, a metallic plate may be used to generate the sonic beam for the WideBeam technique if the metallic plate is of the same material and has the same thickness as the pipe wall. In other words, the generation of the sonic beam for the WideBeam technique is generic to metallic media, and is not limited to metal formed into a pipe wall. The material and thickness of the plate, which are the same as those of the pipe wall are, for example, steel, duplex steel, stainless steel or copper nickel, and in the range of about 0.1 inches to about 1.5 inches.

If the plate and pipe wall are placed in intimate physical contact, it is possible to transfer a considerable portion of the sonic energy induced in the plate into the wall of the pipe. In order to achieve the same sonic impedance, the material and wall thickness of the plate are the same as that of the pipe. Manufacturing tolerances known to those of skill in the art may be tolerated without affecting operation of the system, such that the wall thickness t of the plate can be substantially the same as that of the pipe.

Figure 1:
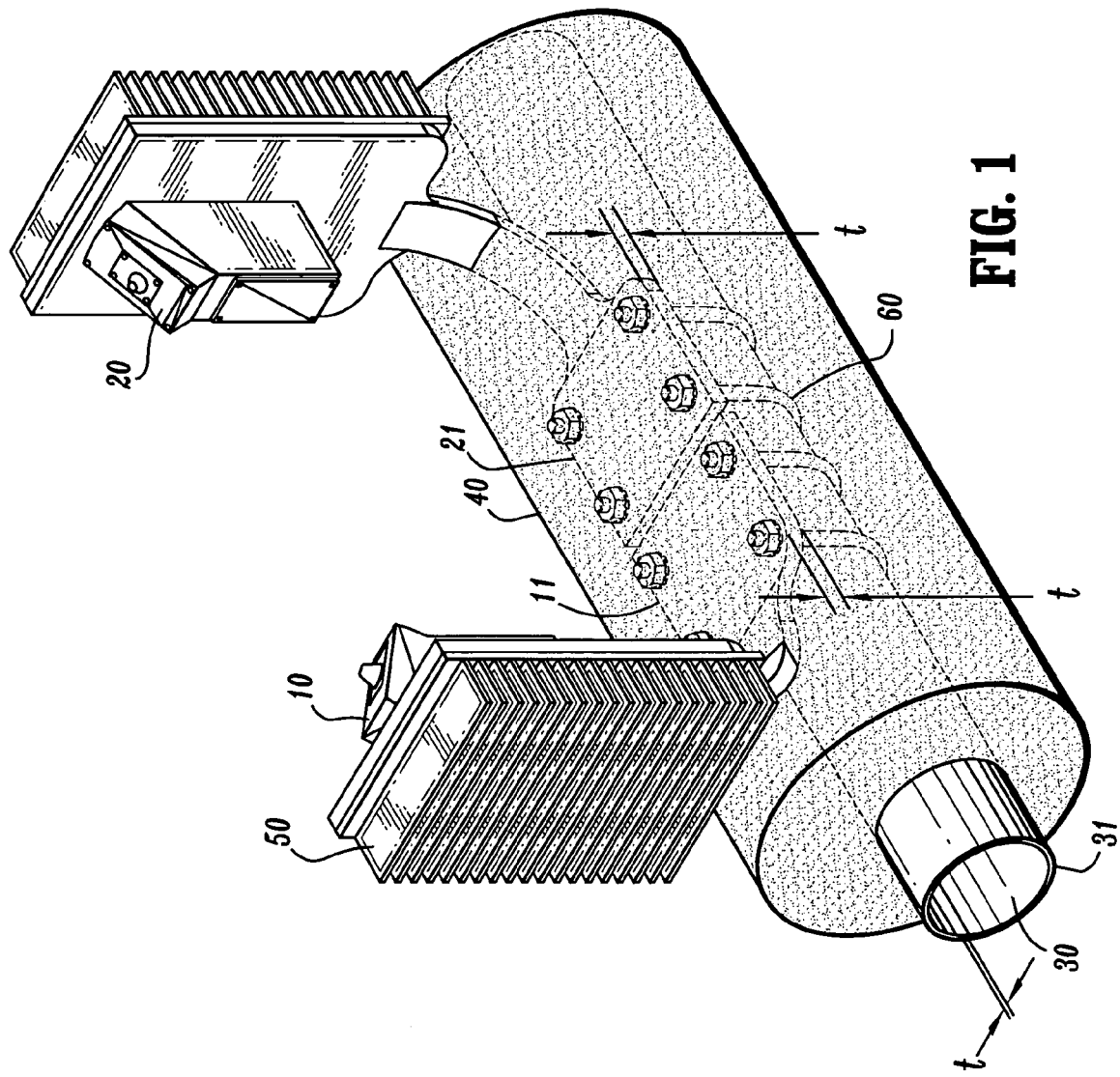
FIG. 1 shows a perspective view of a clamp-on transducer according to an embodiment of the present invention.
Figure 2:
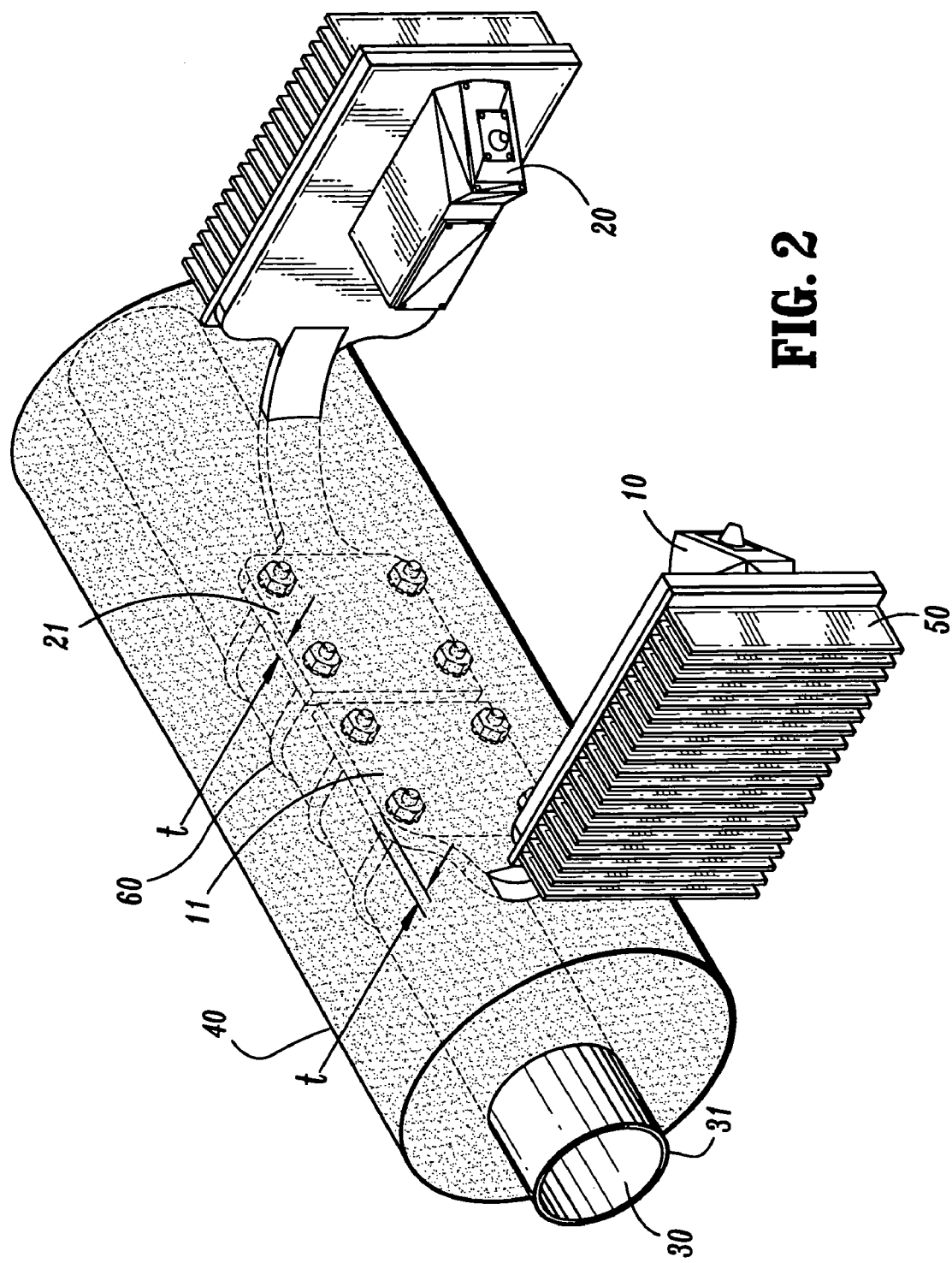
FIG. 2 shows a perspective view of a clamp-on transducer according to an embodiment of the present invention.
Figure 4:
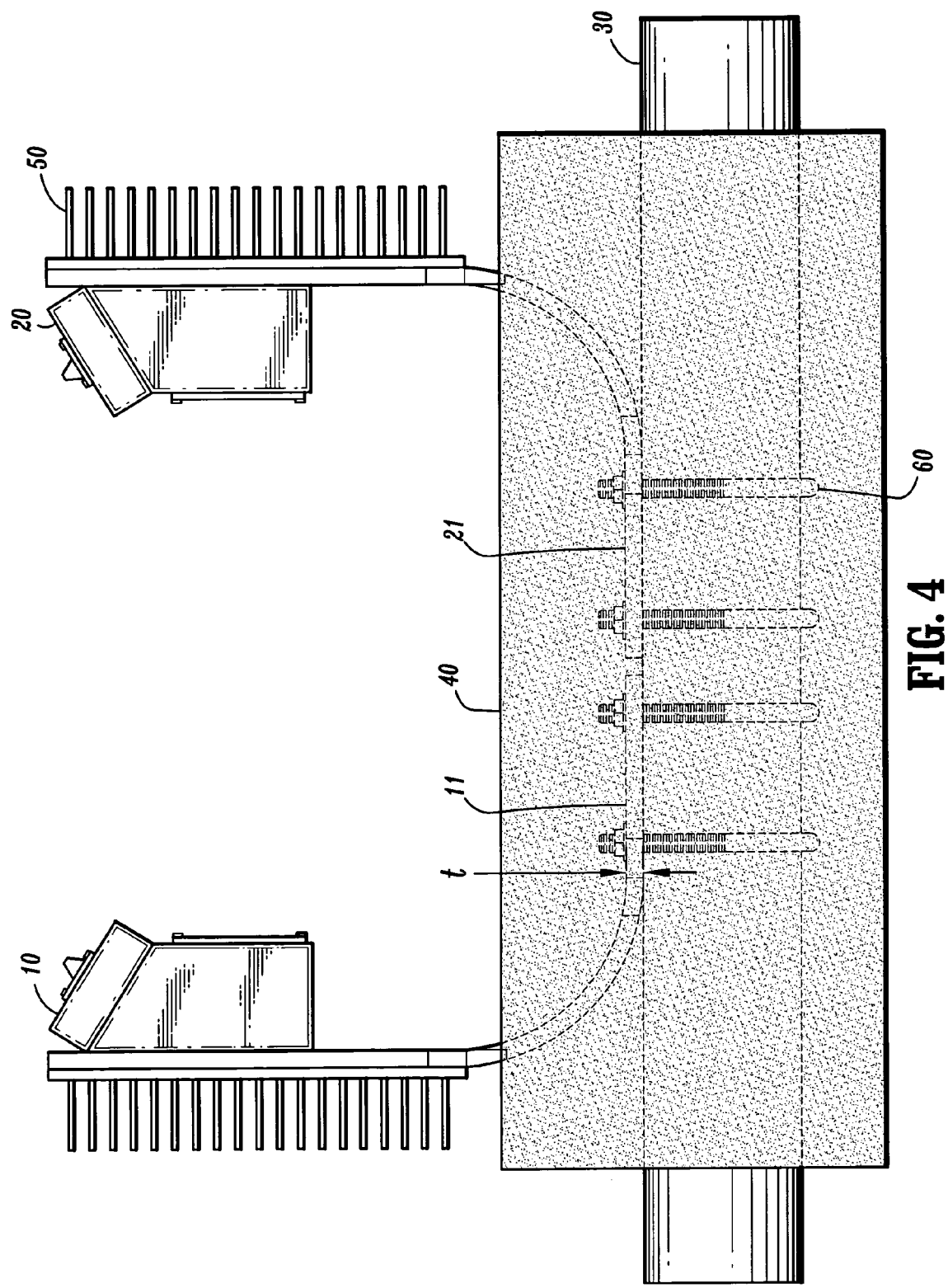
FIG. 4 shows a side view of a clamp-on transducer according to an embodiment of the present invention.

Referring to FIGS. 1, 2 and 4, first and second transducers 10 and 20 are mounted to metallic plates 11 and 21, wherein the metallic plates 11, 21 form a U-shape. The transducers 10 and 20, which are, for example, made from plastic material, are located on opposite upper limbs of the U-shape. These locations, which are away from the wall 31 of the pipe 30, keep the transducers at a much lower (or higher) temperature than that of the pipe wall itself. The transducers 10, 20 are preferably screwed to the plates 11, 21. The screws (not shown) are fed from the side of the plate opposite the transducer so that they enter the bottom of the transducer at a location that does not affect passage of the sonic beam from the transducer into the plate, or vice versa.

Insulation 40 encloses the pipe 30 and part of the metal plates 11, 21 to prevent the high or low temperature of the pipe wall from being expressed at the location of the transducers. The portions of the plates on which the transducers 10, 20 are positioned are not enclosed by the insulation 40 so that the transducers 10, 20 are kept at an ambient temperature as exists outside the insulation. The insulation 40 may be any type of insulation known in the art for use with extreme temperature pipes. The insulation 40 may be enclosed in a sheet steel or aluminum cover.

In a transmit section comprising the "transmit" ultrasonic transducer 10 and the metal plate 11, when sonic energy is induced into the plate 11 from the transducer 10, it will travel down the plate until it reaches the section of plate that is in contact with the pipe wall 31. As the sonic energy continues to travel over the section of the plate 11 that is in contact with the pipe wall 31, sonic energy of exactly the frequency and the phase velocity needed to match the waveguide properties of the pipe wall 31 will pass through an intimate coupling between the plate 11 and the pipe wall 31, so as to induce a WideBeam wave in the pipe 30. The intimate coupling comprises a metallic coupling compound, such as a soft metal including Zinc or an equivalent material, that is sandwiched between the plates 11, 21 and the pipe wall 31. At cryogenic temperatures, a low viscosity liquid couplant, such as DUPONT KRYTOX, may be used.

Since the sonic impedance of the plate 11 and the pipe wall 31 are identical, substantial energy is transferred from the plate 11 to the pipe 30, thereby inducing a sonic wave into the fluid within the pipe 30, whether liquid or gas. Tests show that loss of less than about 10% is encountered when transferring energy from the plate to the pipe.

After passing through the fluid, the sonic wave in the fluid will re-enter the pipe wall 31, as is the case when performing the WideBeam technique. The sonic wave then passes into the receive section comprising the plate 21 and to a "receive" ultrasonic transducer 20. The sonic energy is output as a receive signal from the transducer 20. The receive signal, which is influenced by the flow in the pipe through which the sonic wave has passed, is analyzed with, for example, a computer or other data acquisition device, to determine the characteristics of the flow, such as flow rates. Substantial energy, with little loss is transferred from the pipe wall 31 to the plate 21 due the identical material and thickness t of the pipe wall 31 and plate 21.

By such means it is possible to clamp the transducers 10, 20 to a pipe 30 at extremely high or low temperatures, for example up to 1200° F. or higher, or at the low temperatures encountered in cryogenic applications. The length of the plates 11, 21 forming the U-shape will depend on how much length is needed to separate the transducers 10, 20 from the high or low temperature of the pipe 30 so as to reduce or raise the temperature of the transducers 10, 20. The mounting location and length of the plates may depend on reaching an acceptable temperature of the transducers 10, 20, for example in the range from about 0° F. to about 250° F. Computer programs, which enable the computation of the temperature at all places along the plates 11, 21 and the transducers 10, 20 outside the insulation 40, may be used to determine appropriate mounting location of the transducers and length of the plates. Alternatively, the location and length may be determined by experiment. The limit of such length is dependent only on how much distance along the plates the sonic beam can travel without losing its coherence.

Figure 3:
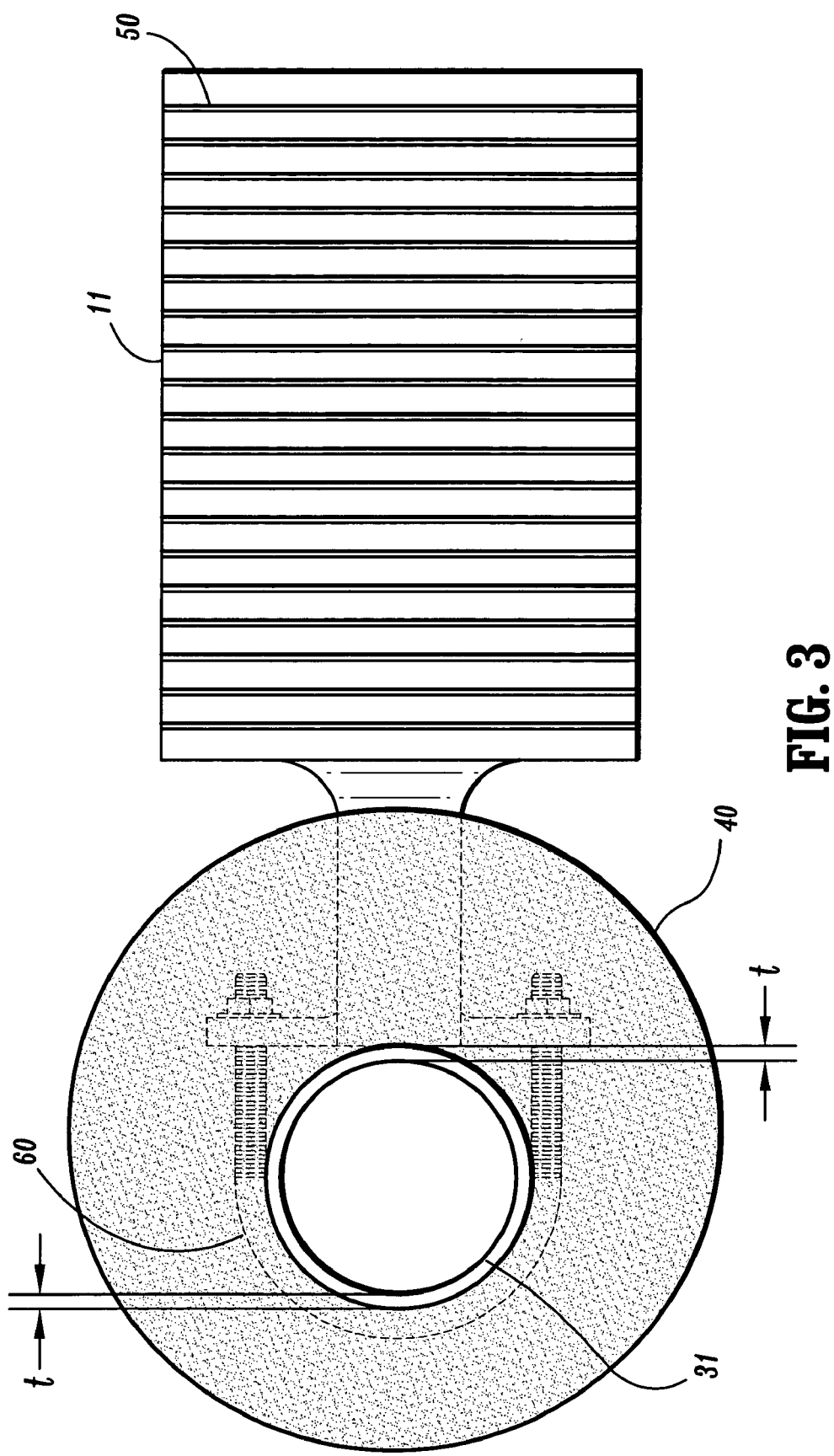
FIG. 3 shows a side view of a clamp-on transducer according to an embodiment of the present invention.

As shown in FIGS. 1 and 2, the plates 11, 21 have widths about the same width as the transducers 10, 20, except that, as shown in FIGS. 2 and 3, the width is increased near the transducers 10, 20 to allow for thermal radiators 50 which may further reduce temperature. The width of the plates 11, 21 is also increased where the plates 11, 12 contact the pipe 30 to allow for bolting to the pipe 30.

The bolting mechanism 60, for example, a plurality of steel pipe clamps or U-bolts, must be applied with great force so that the intimate coupling compound will be crushed between the plates 11, 21 and the pipe wall 31 to create an intimate contact therebetween.

Figure 5:
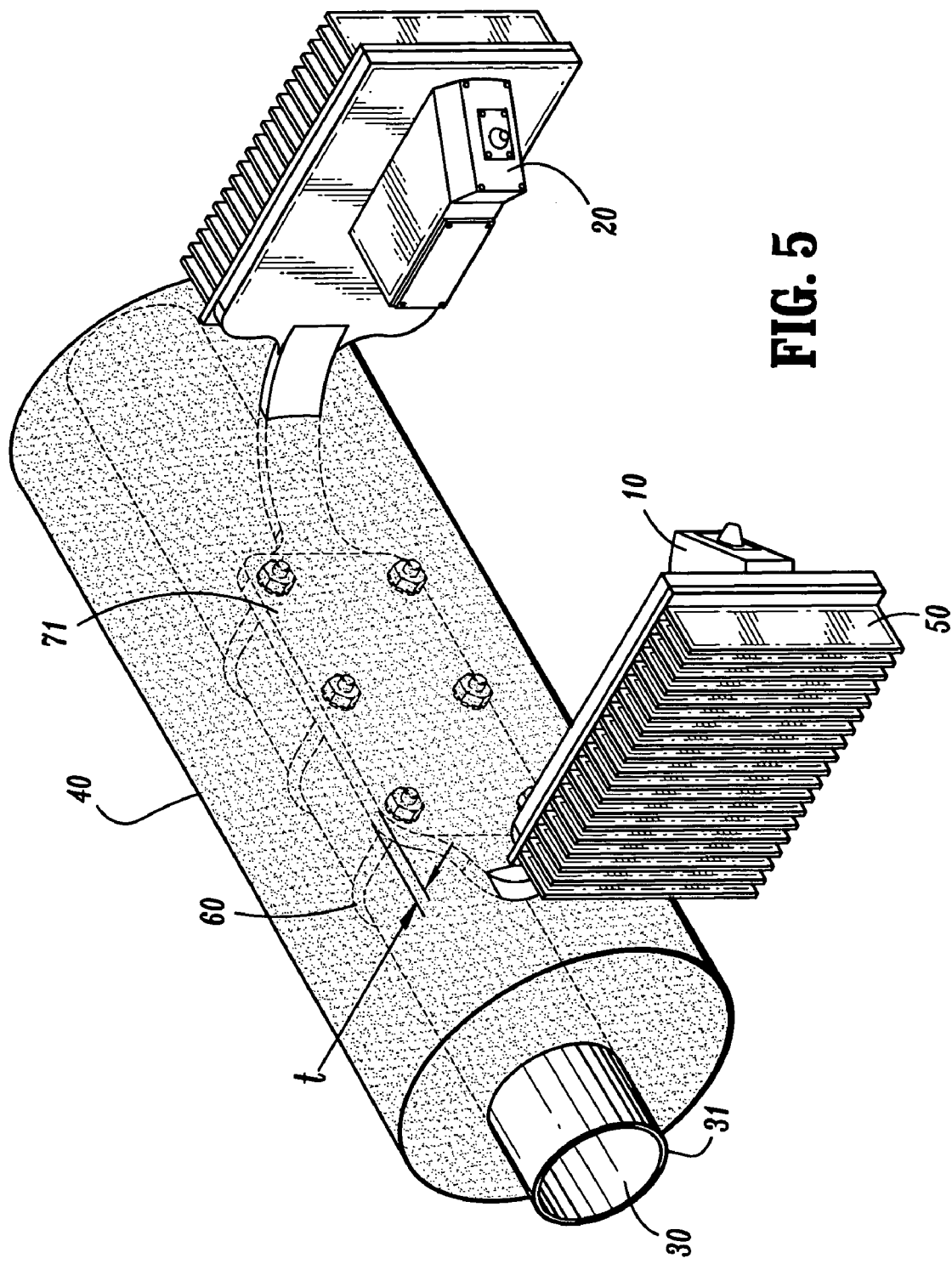
FIG. 5 shows a perspective view of a clamp-on transducer according to another embodiment of the present invention.

Referring to FIG. 5, as an alternative to the plates 11, 21, a one-piece U-shaped plate 71 is used for mounting the transducers 10, 20 to the pipe 30 and for generating the sonic beam for the WideBeam technique. Like the plates 11, 21, the plate 71 is of the same material and has the same thickness t as the pipe wall 31. The function and configuration of the plate 71 is substantially the same as those of the plates 11, 21, except the plate 71 is one-piece as opposed to two sections spaced apart from each other.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A device for measuring flow in a pipe, comprising:
    a first metal plate mounted to the pipe, the first metal plate including a first contact portion contacting a wall of the pipe and a first away portion spaced apart from the wall of the pipe;
    a second metal plate mounted to the pipe, the second metal plate including a second contact portion contacting the wall of the pipe and a second away portion spaced apart from the wall of the pipe;
    a first transducer mounted to the first away portion;
    a second transducer mounted to the second away portion; and
    insulation enclosing at least a portion of the pipe and the first and second contact portions.

2. The device as recited in claim 1, wherein the first and second metal plates are positioned adjacent each other to form a U-shape on the pipe.

3. The device as recited in claim 2, wherein a bottom portion of the U-shape includes the first and second contact portions and side portions of the U-shape include respective first and second away portions.

4. The device as recited in claim 1, wherein the first and second metal plates include the same material as the pipe wall.

5. The device as recited in claim 1, wherein the first and second metal plates have substantially the same thickness as the pipe wall.

6. The device as recited in claim 1, further comprising a coupling positioned between the first and second contact portions and the wall of the pipe.

7. The device as recited in claim 6, wherein the coupling is a metallic coupling compound.

8. The device as recited in claim 6, wherein the coupling is a liquid couplant.

9. The device as recited in claim 1, further comprising a plurality of fasteners for attaching the first and second contact portions to the pipe.

10. The device as recited in claim 9, wherein the plurality of fasteners include U-bolts, clamps or a combination thereof.

11. The device as recited in claim 1, further comprising a plurality of thermal radiators extending from each of the first and second away portions.

12. The device as recited in claim 1, wherein sonic energy from the first transducer is transferred to the pipe wall via the first metal plate.

13. The device as recited in claim 1, wherein the second transducer receives sonic energy from the pipe wall via the second metal plate.

14. A device for measuring flow in a pipe, comprising:
    a metal plate mounted to the pipe, the metal plate including a contact portion contacting a wall of the pipe and first and second end portions spaced apart from the wall of the pipe;
    a first transducer mounted to the first end portion;
    a second transducer mounted to the second end portion; and
    insulation enclosing at least a portion of the pipe and the contact portion.

15. The device as recited in claim 14, wherein:
    the metal plate forms a U-shape on the pipe;
    a bottom portion of the U-shape includes the contact portion; and
    side portions of the U-shape include respective first and second end portions.

16. The device as recited in claim 14, wherein the metal plate includes the same material as the pipe wall.

17. The device as recited in claim 14, wherein the metal plate has substantially the same thickness as the pipe wall.

18. The device as recited in claim 14, further comprising a coupling positioned between the contact portion and the wall of the pipe.

19. The device as recited in claim 14, further comprising a fastener for attaching the contact portion to the pipe.

20. The device as recited in claim 14, further comprising a plurality of thermal radiators extending from each of the first and second end portions.

21. The device as recited in claim 14, wherein sonic energy from the first transducer is transferred to the pipe wall via the metal plate.

22. The device as recited in claim 14, wherein the second transducer receives sonic energy from the pipe wall via the metal plate.

23. A device for measuring flow in a pipe, comprising:
    a transmit portion mounted to the pipe, the transmit portion including a first away portion spaced apart from the wall of the pipe;
    a receiving portion mounted to the pipe, the receiving portion including a second away portion spaced apart from the wall of the pipe;
    a first transducer mounted to the first away portion;
    a second transducer mounted to the second away portion; and a plurality of thermal radiators extending from at least one of the first and second away portions.

24. The device as recited in claim 23, wherein:
the transmit portion comprises a first metal plate including the first away portion and a first contact portion contacting the pipe; and
the receiving portion comprises a second metal plate in including the second away portion and a second contact portion contacting the pipe.

25. The device as recited in claim 23, wherein the transmit and receive portions are located on a metal plate including the first and second away portions at respective end portions thereof and a contact portion contacting the pipe.

26. A device for measuring flow in a pipe comprising:
a first metal plate mounted to the pipe, the first metal plate including a first contact portion contacting a wall of the pipe, a first away portion spaced apart from the wall of the pipe, and a first center portion connecting the first contact portion and the first away portion;
a second metal plate mounted to the pipe, the second metal plate including a second contact portion contacting the wall of the pipe, a second away portion spaced apart from the wall of the pipe, and a second center portion connecting the second contact portion and the second away portion;
a first transducer mounted to the first away portion; and
a second transducer mounted to the second away portion, wherein the first and second center portions curve away from the pipe and the first and second center portions each have a different width than the first and second contact portions, respectively.

27. The device as recited in claim 26, wherein the first and second center portions each have a different width than the first and second away portions, respectively.

* * * * *